(12) United States Patent
Doval et al.

(10) Patent No.: US 10,387,405 B2
(45) Date of Patent: Aug. 20, 2019

(54) DETECTING INCONSISTENCIES IN HIERARCHICAL ORGANIZATION DIRECTORIES

(71) Applicant: HEWLETT PACKARD ENTERPRISE DEVELOPMENT LP, Houston, TX (US)

(72) Inventors: Shruti Doval, Bangalore (IN); Venkataraman Kamalaksha, Bangalore (IN); Rohit Balakrishna, Bangalore (IN); Rajat Verma, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 198 days.

(21) Appl. No.: 15/522,609

(22) PCT Filed: Apr. 24, 2015

(86) PCT No.: PCT/US2015/027419
§ 371 (c)(1),
(2) Date: Apr. 27, 2017

(87) PCT Pub. No.: WO2016/073029
PCT Pub. Date: May 12, 2016

(65) Prior Publication Data
US 2018/0276268 A1    Sep. 27, 2018

(30) Foreign Application Priority Data
Nov. 3, 2014    (IN) .......................... 5500/CHE/2014

(51) Int. Cl.
*G06F 16/00* (2019.01)
*G06F 16/23* (2019.01)
(Continued)

(52) U.S. Cl.
CPC ...... *G06F 16/2365* (2019.01); *G06F 11/0727* (2013.01); *G06F 11/0751* (2013.01);
(Continued)

(58) Field of Classification Search
CPC ......... G06F 17/30094; G06F 17/30212; G06F 11/1435; G06F 17/30206; G06F 2201/82;
(Continued)

(56) References Cited

U.S. PATENT DOCUMENTS 7,177,935 B2    2/2007    Bradshaw et al.
7,240,114 B2    7/2007    Karamanolis et al.
(Continued)

FOREIGN PATENT DOCUMENTS

WO    WO-2010050944 A1    5/2010

OTHER PUBLICATIONS

International Search Report and Written Opinion received for PCT Patent Application No. PCT/US2015/027422, dated Jul. 31, 2015, 8 pages.
(Continued)

*Primary Examiner* — Merilyn P Nguyen
(74) *Attorney, Agent, or Firm* — Hewlett Packard Enterprise Patent Department

(57) ABSTRACT

In one example, a system is described in which a storage device, communicatively coupled to a processor, includes an inconsistency detection and reconstruction tool. The inconsistency detection and reconstruction tool may create a database including metadata associated with hierarchical organization directories and policy and configuration data files in a file system. Further, the inconsistency detection and reconstruction tool may perform consistency check of one or more of the hierarchical organization directories, the policy and configuration data files and the metadata to detect inconsistencies. Furthermore, the inconsistency detection
(Continued)

and reconstruction tool may reconstruct one or more of the hierarchical organization directories, the policy and configuration data files and the metadata based on the outcome of the consistency check.

17 Claims, 6 Drawing Sheets

(51) Int. Cl.
  *G06F 16/185* (2019.01)
  *G06F 16/901* (2019.01)
  *G06F 11/07* (2006.01)
  *G06F 16/10* (2019.01)
  *G06F 11/14* (2006.01)
(52) U.S. Cl.
  CPC ........ *G06F 16/185* (2019.01); *G06F 16/9017* (2019.01); *G06F 11/1458* (2013.01); *G06F 16/10* (2019.01)
(58) Field of Classification Search
  CPC .. G06F 16/2365; G06F 11/1458; G06F 16/10; G06F 16/182; G06F 11/0727; G06F 11/0751; G06F 16/185; G06F 16/9017
  See application file for complete search history.

(56) References Cited

U.S. PATENT DOCUMENTS

| | | | |
|---|---|---|---|
| 7,430,570 B1* | 9/2008 | Srinivasan | G06F 16/134 |
| 7,496,565 B2 | 2/2009 | Thind et al. | |
| 7,610,307 B2 | 10/2009 | Havewala et al. | |
| 7,650,341 B1* | 1/2010 | Oratovsky | G06F 11/1435 |
| | | | 707/999.01 |
| 7,739,240 B2 | 6/2010 | Saito et al. | |
| 8,006,056 B2 | 8/2011 | Voigt et al. | |
| 8,099,758 B2 | 1/2012 | Schaefer et al. | |
| 8,103,639 B1* | 1/2012 | Srinivasan | G06F 17/30094 |
| | | | 707/690 |
| 8,311,980 B2 | 11/2012 | Saito et al. | |
| 8,671,108 B2* | 3/2014 | Kondasani | G06F 16/958 |
| | | | 707/769 |
| 8,751,547 B2 | 6/2014 | Cross et al. | |
| 9,471,595 B1* | 10/2016 | Vempati | G06F 12/00 |
| 2002/0049782 A1 | 4/2002 | Herzenberg et al. | |
| 2004/0204949 A1* | 10/2004 | Shaji | G06F 11/1415 |
| | | | 717/174 |
| 2006/0259949 A1 | 11/2006 | Schaefer et al. | |
| 2006/0271577 A1* | 11/2006 | Lin | G06F 17/21 |
| 2006/0282471 A1 | 12/2006 | Mark et al. | |
| 2007/0112789 A1* | 5/2007 | Harvey | H04L 29/12132 |
| 2007/0112790 A1* | 5/2007 | Harvey | G06F 16/9027 |
| 2007/0143292 A1 | 6/2007 | Nozaki et al. | |
| 2008/0294704 A1 | 11/2008 | Akagawa et al. | |
| 2008/0320055 A1* | 12/2008 | Sagar | G06F 16/178 |
| 2010/0138922 A1 | 6/2010 | Zaifman et al. | |
| 2010/0281083 A1 | 11/2010 | Purtell et al. | |
| 2012/0036161 A1* | 2/2012 | Lacapra | G06F 16/13 |
| | | | 707/781 |
| 2012/0117035 A1 | 5/2012 | Ranade et al. | |
| 2012/0158652 A1 | 6/2012 | Ps et al. | |
| 2013/0282668 A1* | 10/2013 | Hsieh | G06F 16/215 |
| | | | 707/691 |
| 2013/0325817 A1 | 12/2013 | Whitehouse | |
| 2014/0006465 A1* | 1/2014 | Davis | G06F 17/30194 |
| | | | 707/827 |

OTHER PUBLICATIONS

International Search Report and Written Opinion received for PCT Patent Application No. PCT/US2015/027419, dated Jul. 29, 2015, 8 pages.
International Preliminary Report on Patentability received for PCT Patent Application No. PCT/US2015/027422, dated May 18, 2017, 7 pages.
International Preliminary Report on Patentability received for PCT Patent Application No. PCT/US2015/027419, dated May 18, 2017, 7 pages.
Gunawi, H.S. et al., "Improving File System Reliability with I/O Shepherding," (Research Paper), Oct. 14-17, 2007, 14 pages, http://www.sosp2007.org/papers/sosp068-gunawi.pdf.
Kamalaksha, V., "Policy and Configuration Data For a User Directory", 5491/CHE/2014, Nov. 3, 2014, 32 pages.
Lu, Y. et al., "ReconFS: A Reconstructable File System on Flash Storage," (Research Paper), Feb. 17-20, 2014, 15 pages, https://www.usenix.org/system/files/conference/fast14/fast14-paper_lu.pdf.
McKusick, MK et al., "Fsck—The UNIX File System Check Program," (Research Paper), Oct. 7, 1996, UNIX vol. II, pp. 581-592.
Oracle Corporation, "What fsck Checks and Tries to Repair," (Research Paper), 5 pages, http://docs.oracle.com/cd/E19455-01/805-7228/6j6q7ufOe/index.html.

* cited by examiner

DETECTING INCONSISTENCIES IN HIERARCHICAL ORGANIZATION DIRECTORIES

CROSS REFERENCE TO RELATED APPLICATIONS

A reference is made to application No. 5491/CHE/2014 entitled "POLICY AND CONFIGURATION DATA FOR A USER DIRECTORY" by Hewlett Packard Development Company, L.P filed on Nov. 3, 2014.

BACKGROUND

A file system can be used to store data in files and organize the files into hierarchical directories. Typically, a file system may get corrupted due to hardware, firmware and/or software errors. In such situations, a file system consistency check (FSCK) tool may be used to find and fix inconsistencies in the file system.

BRIEF DESCRIPTION OF THE DRAWINGS

Examples of the disclosure will now be described in detail with reference to the accompanying drawings, in which.

DETAILED DESCRIPTION

Figure 1:
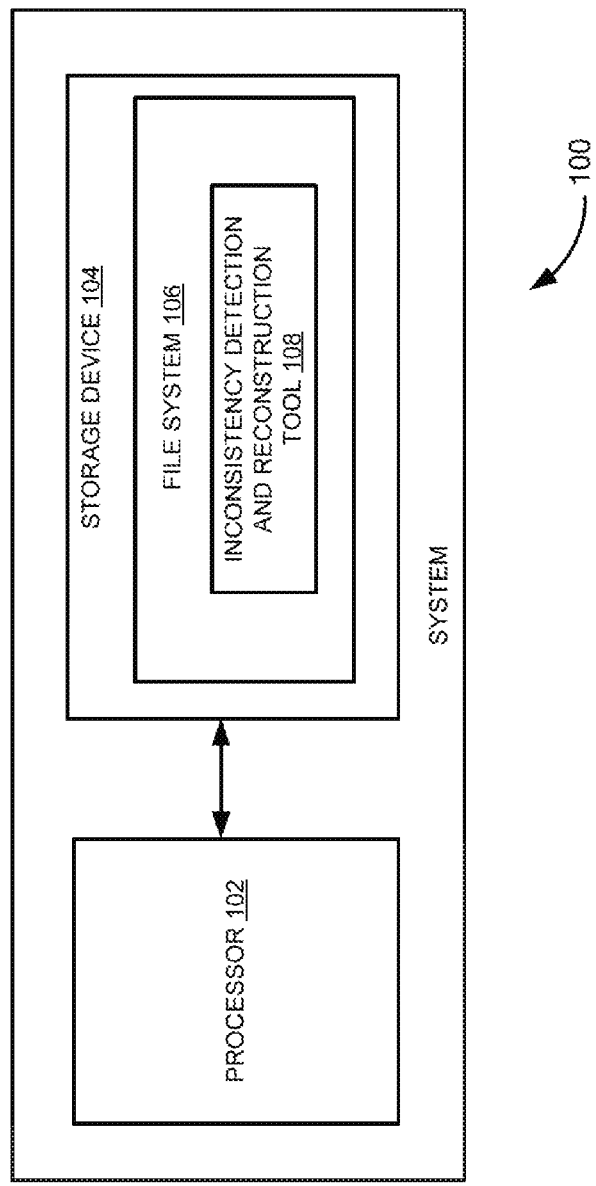
FIG. 1 illustrates a block diagram of an example system for detecting inconsistencies and reconstructing hierarchical organization directories, policy and configuration data files and/or metadata in a file system.

In the following detailed description of the examples of the present subject matter, references are made to the accompanying drawings that form a part hereof, and in which are shown by way of illustration specific in which the present subject matter may be practiced. These examples are described in sufficient detail to enable those skilled in the art to practice the present subject matter, and it is to be understood that other examples may be utilized and that changes may be made without departing from the scope of the present subject matter. The following detailed description is, therefore, not to be taken in a limiting sense, and the scope of the present subject matter is defined by the appended claims.

Examples described herein provide enhanced methods, techniques, and systems for detecting inconsistencies and reconstructing hierarchical organization directories, policy and configuration data files and/or metadata in a file system.

Generally, a file system consistency check (FSCK) tool is invoked to ensure consistency in a file system. The FSCK tool may be invoked after a system crash, a periodic health check for the file system, a user initiated consistency check and the like. To ensure consistency, the FSCK tool considers some piece of metadata associated with the file system as primal to detect and repair inconsistencies in the file system. After a successful run of the FSCK tool, the user data in the file system may be accessible without any issues. However, the FSCK tool may not detect or repair some or all inconsistencies in user data.

In certain types of corruption scenarios, namespace co-relation associated with a file/directory may be completely lost. In these situations, the FSCK tool may recover the file/directory whose original name and/or parent file association cannot be determined and may place the file/directory in an "orphaned objects directory" in the file system. The FSCK tool may not have the ability to recover such files/directories to the right name and/or hierarchy in namespace of the file system.

In other scenarios, the FSCK tool may not be able to perform consistency check if the primal metadata is corrupted. Some existing solutions use replicas of the primal metadata to overcome this problem. However, if the replicated primal metadata is lost, the FSCK tool may not be able to validate and repair the file system. Further, such replications may result in performance and storage overheads.

To address these issues, the present disclosure describes various examples for detecting inconsistencies and reconstructing hierarchical organization directories, policy and configuration data files and/or metadata in a file system. In one example, the file system includes hierarchical organization directories, which are computing device and operating system (OS) independent, under a root directory in a namespace of the file system. Further, the file system includes user directories located under the hierarchical organization directories. Furthermore, the file system includes policy and configuration data files. For example, the policy and configuration data files include policy and configuration data associated with the hierarchical organization directories and policy and configuration data associated with the user directories. In addition, attributes (also referred to as metadata) associated with the hierarchical organization directories and the policy and configuration data files are stored in hierarchical organization directories namespace in the file system. The hierarchical organization directories, the policy and configuration data files and the metadata must be accessible and consistent in order for any user data in the file system to be accessible.

For example, in a system crash scenario, the file system may be in an inconsistent state. In such a scenario, the FSCK tool may be invoked to bring the file system to a consistent state. Further, the hierarchical organization directories, the policy and configuration data files and the metadata associated with the hierarchical organization directories and the policy and configuration data files are detected and reconstructed as described in the present disclosure.

The present disclosure describes creating a database including metadata associated with the hierarchical organization directories and the policy and configuration data files in the file system. Further, consistency check of the hierarchical organization directories, the policy and configuration data files and/or the metadata is performed. Furthermore, the hierarchical organization directories, the policy and configuration data files and/or the metadata are reconstructed based on the outcome of the consistency check.

The example implementations mentioned herein provides ability to create a database including the metadata associated with the hierarchical organization directories and the policy and configuration data files in the file system. The present disclosure further provides ability to choose between the metadata in the database and information in the hierarchical organization directories namespace as authoritative source for performing the consistency check. In one example, the hierarchical organization directories namespace in the file system includes the hierarchical organization directories and the policy and configuration data files. Further, the information in the hierarchical organization directories namespace includes the metadata associated with the hierarchical organization directories and the policy and configuration data files stored in associated inodes, extended attributes and/or any other way of associating metadata with the hierarchical organization directories and the policy and configuration data files. For example, the metadata includes attributes such as, a name, a unique identifier (ID) and an inode ID associated with the hierarchical organization directories and the policy and configuration files. The present disclosure further describes reconstructing the metadata in the database based on the information in the hierarchical organization directories namespace when the metadata in the database is inconsistent.

The present disclosure also describes recovering orphaned hierarchical organization directories, i.e., hierarchical organization directories placed in the orphaned objects directory to their correct name hierarchy in the namespace in the file system using metadata in the database. Similarly, any orphaned policy and configuration data files may be recovered. In one example, the present disclosure describes recovering orphaned hierarchical organization directories and policy and configuration data files, using inode (index node) IDs stored in inodes, extended attributes and/or any other metadata that is part of the hierarchical organization directories and policy and configuration data files, when the associated metadata in the database is lost.

FIG. 1 illustrates a block diagram of an example system 100 for detecting inconsistencies and reconstructing hierarchical organization directories, policy and configuration data files and/or metadata in a file system 106. The system 100 may represent any type of computing device capable of reading machine-executable instructions. Examples of computing device may include, without limitation, a server, a desktop computer, a notebook computer, a tablet computer, a thin client, a mobile device, a personal digital assistant (PDA), a phablet, and the like.

In the example of FIG. 1, the system 100 may include a processor 102 and storage device 104 coupled to the processor 102. In an example, the storage device 104 may be a machine readable storage medium (e.g., a disk drive). The machine-readable storage medium may also be an external medium that may be accessible to the system 100. Further, the storage device 104 may include the file system 106. Furthermore, the file system 106 may include an inconsistency detection and reconstruction tool 108.

For example, the inconsistency detection and reconstruction tool 108 may refer to software components (machine executable instructions), a hardware component or a combination thereof. The inconsistency detection and reconstruction tool 108 may include, by way of example, components, such as software components, processes, tasks, co-routines, functions, attributes, procedures, drivers, firmware, data, databases, data structures and Application Specific Integrated Circuits (ASIC). The inconsistency detection and reconstruction tool 108 may reside on a volatile or non-volatile storage medium and configured to interact with a processor 102 of the system 100.

Figure 3:
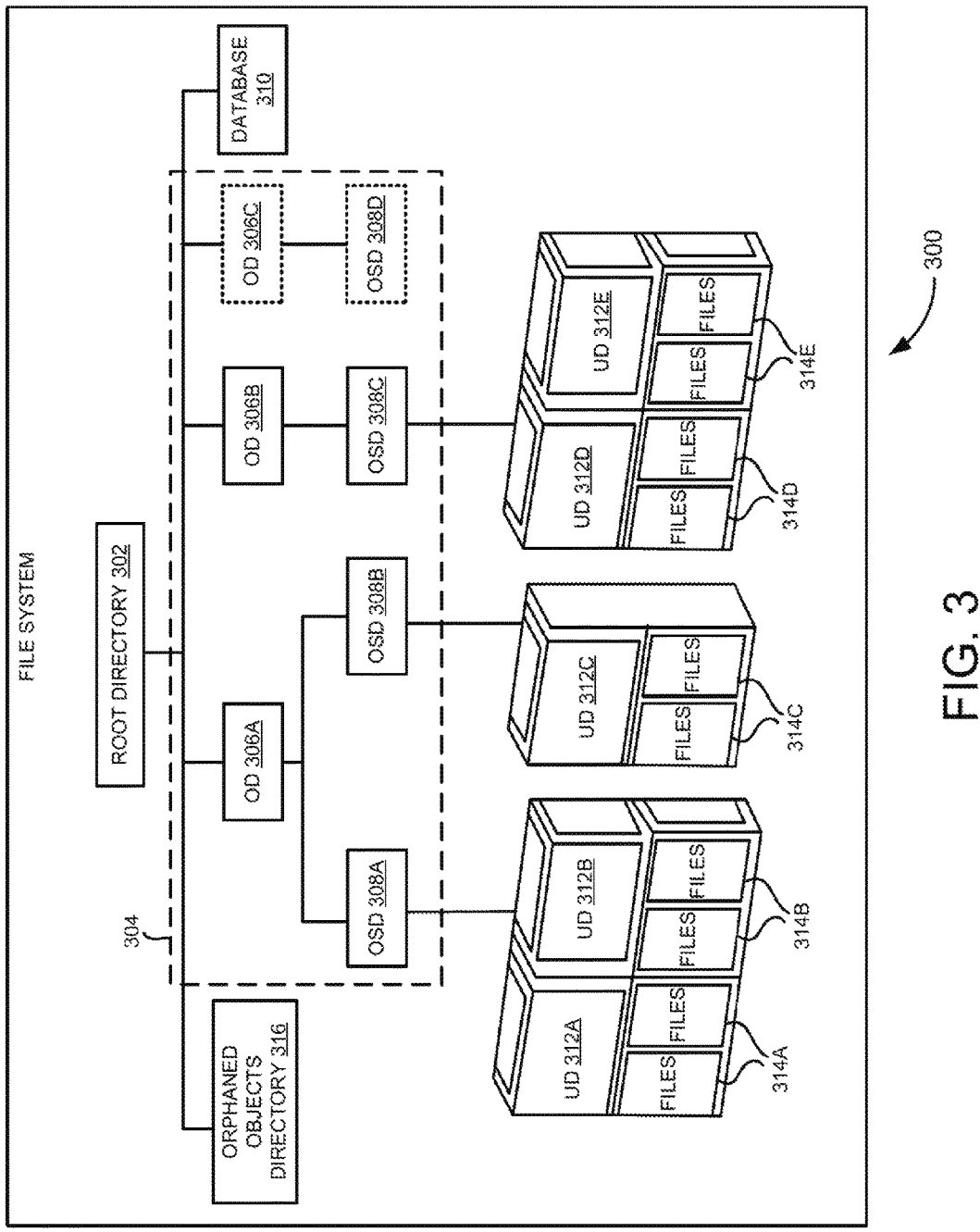
FIG. 3 illustrates a block diagram of an example file system, such as those shown in FIGS. 1 and 2.

In one example, the file system 106 may include hierarchical organization directories (e.g., hierarchical organization directories 304 shown in FIG. 3). For example, the hierarchical organization directories are top level directory hierarchies in the file system 106 as shown in FIG. 3. The hierarchical organization directories may be located between a root directory (e.g., a root directory 302 shown in FIG. 3) and user directories (e.g., user directories (UDs) 312A-E shown in FIG. 3) in the file system 106. This is explained in detail with reference to FIG. 3. For example, the hierarchical organization directories serve as an entry point to user data stored in the user directories. These hierarchical organization directories may be marked with a flag and a unique ID for uniquely identifying the hierarchical organization directories. For example, the unique IDs associated with the hierarchical organization directories are monotonically increasing to ensure that there are no collisions.

In this example, each of the hierarchical organization directories is associated with metadata. For example, the metadata includes attributes, such as a name, a parent ID, an inode ID, the unique ID and so on. In one example, metadata associated with a hierarchical organization directory may be stored in an inode and/or extended attributes associated with the hierarchical organization directory. An inode is a data structure used to represent file system objects, such as files and directories. The inode and the extended attributes associated with the hierarchical organization directories may be stored in the file system 106.

Further in this example, the hierarchical organization directories may be associated with policy and configuration data files. The policy and configuration data files may include default policy and configuration data associated with the hierarchical organization directories and policy and configuration data associated with the user directories. For example, the policy and configuration data files may be stored in any directory in the file system 106. Furthermore, metadata associated with the configuration and policy data files may be stored as extended attributes and/or inode associated with the configuration and policy data files. For example, the metadata associated with the policy and configuration data files includes a name (e.g., a policy name and a configuration name), a unique ID, an inode ID, a unique ID of the associated hierarchical organization directory and so on.

In operation, the inconsistency detection and reconstruction tool 108 may create a database (e.g., a database 310 shown in FIG. 3) to include the metadata associated with the hierarchical organization directories and the policy and configuration data files in the file system 106. For example, the database may be a directory under the root directory in the file system 106 as shown in FIG. 3. Further, the database may include a first file to store the metadata associated with the hierarchical organization directories. The inconsistency detection and reconstruction tool 108 may create a record for each of the hierarchical organization directories in the first file. Each record may include metadata associated with the hierarchical organization directories. For example, the records may be created as and when the hierarchical organization directories are created in the file system 106. Furthermore, the database may include a second file to store the metadata associated with the policy and configuration data files. It may be understood that, the database is made self sufficient to reconstruct hierarchical organization directories namespace and policies and configuration data stored in it.

Further, each of the first and the second files in the database are associated with a unique ID for its identification and a checksum for validating its integrity. A checksum is a small-size datum that is computed from arbitrary blocks of data for the purpose of detecting errors. The checksum may be computed using standard checksum algorithms, such as cyclic redundancy check 32 (CRC32) and the like.

In a system crash scenario, the file system 106 may be in an inconsistent state. In such a scenario, a FSCK tool (e.g., a FSCK tool 206 shown in FIG. 2) may be invoked to bring the file system 106 to a consistent state. The FSCK tool may use the metadata in the database to bring the file system 106 to a consistent state. In one example, the FSCK tool may recover one or more objects (e.g., hierarchical organization directories and policy and configuration data files) whose name cannot be determined. Such objects are referred to as orphaned objects. In this example, the FSCK tool may place the orphaned objects in an orphaned objects directory (e.g., an orphaned objects directory 316, shown in FIG. 3) under the root directory of the file system 106. For example, the FSCK tool may name an orphaned object using an inode ID associated with the orphaned object.

Figure 2:
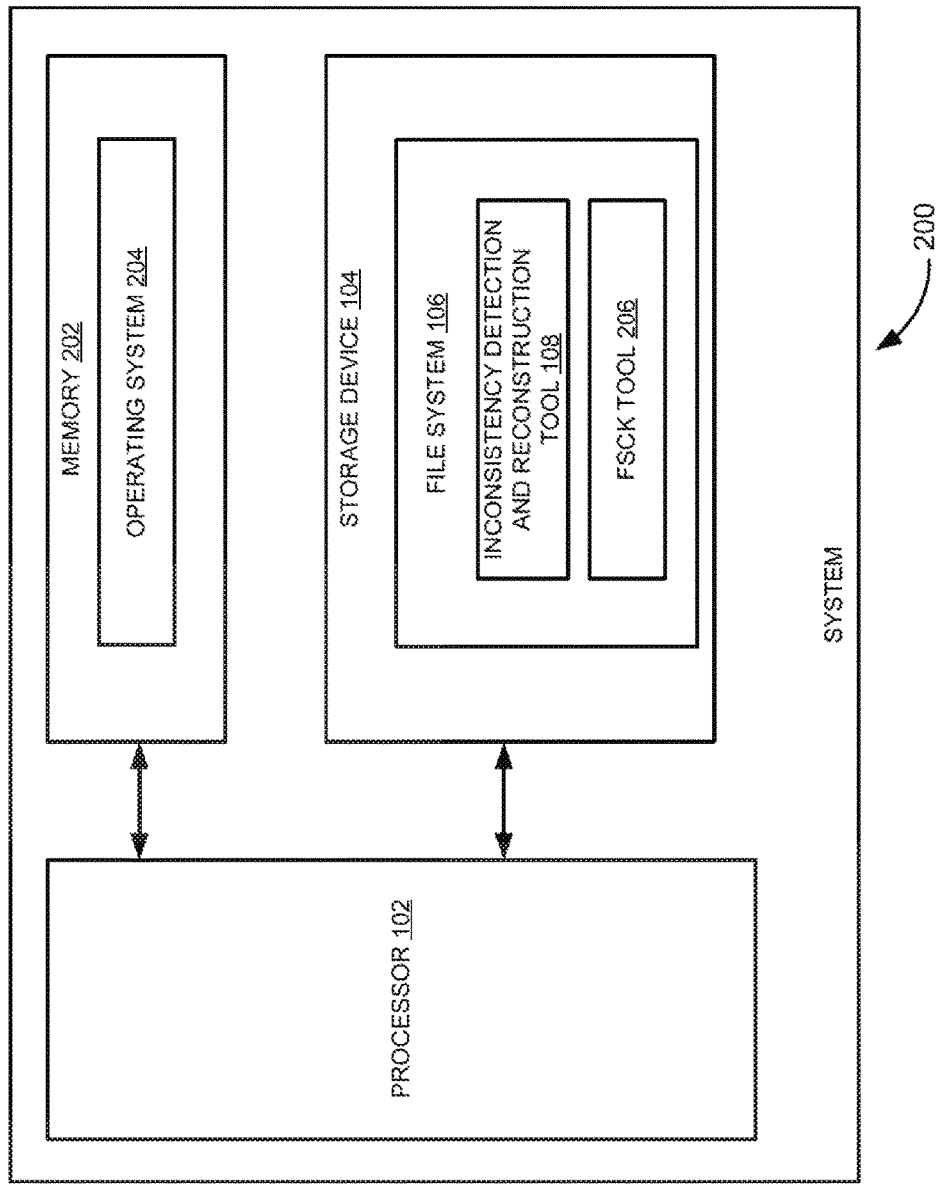
FIG. 2 illustrates a block diagram of another example system for detecting inconsistencies and reconstructing the hierarchical organization directories, the policy and configuration data files and/or the metadata in the file system.

Further, OS (e.g., OS 204 residing in memory 202 (e.g., an internal memory) of a system 200, shown in FIG. 2) may send a request to the inconsistency detection and reconstruction tool 108 to perform consistency check of the hierarchical organization directories, policy and configuration data files and the metadata stored in the database. For example, the OS may also send the request during a periodic consistency check of the file system, a user initiated consistency check and the like.

To perform the consistency check of the metadata in the database, the inconsistency detection and reconstruction tool 108 validates integrity of the metadata. For example, the inconsistency detection and reconstruction tool 108 may validate integrity of the metadata using checksum. In this example, the inconsistency detection and reconstruction tool 108 computes a checksum for each of the first and the second files in the database. Further, the inconsistency detection and reconstruction tool 108 determines whether the computed checksum for each of the first and the second files matches with the checksum associated with the first and second files, respectively. In one example, if it is determined that the checksums match, the inconsistency detection and reconstruction tool 108 may conclude that the metadata is consistent and may perform consistency check of the hierarchical organization directories and the policy and configuration data files using the metadata in the first and the second files, respectively.

During the consistency check of the hierarchical organization directories using the metadata in the first file, it is determined whether a hierarchical organization directory corresponding to each record in the first file is present in the file system 106. If it is determined that a hierarchical organization directory corresponding to each record in the first file is present in the file system 106, the inconsistency detection and reconstruction tool 108 may conclude that the hierarchical organization directories in the file system 106 are consistent. If it is determined that a hierarchical organization directory corresponding to each record in the first file is not present in the file system 106, the inconsistency detection and reconstruction tool 108 may conclude that the hierarchical organization directories in the file system 106 are inconsistent and may require repair and/or reconstruction.

To reconstruct the hierarchical organization directories using the metadata in the first file, the inconsistency detection and reconstruction tool 108 may determine whether a hierarchical organization directory corresponding to a record in the first file is present in the file system 106. For example, the inode ID stored in the record is used to determine whether a hierarchical organization directory with the same inode ID is present in the file system 106.

If it is determined that a hierarchical organization directory corresponding to the record is not present, the inconsistency detection and reconstruction tool 108 checks the orphaned objects directory to determine whether a hierarchical organization directory with the same in ode ID is present. If the hierarchical organization directory with the same inode ID is present in the orphaned objects directory, the inconsistency detection and reconstruction tool 108 may restore the hierarchical organization directory to correct location in the hierarchical organization directory namespace. If the hierarchical organization directory with the same inode ID is not present in the orphaned objects directory, the inconsistency detection and reconstruction tool 108 may create the hierarchical organization directory with the unique ID associated with the hierarchical organization directory in the hierarchical organization directory namespace and restore contents of the hierarchical organization directory from a backup.

Further, if it is determined that the hierarchical organization directory corresponding to the record is present, the inconsistency detection and reconstruction tool 108 may compare the metadata associated with the hierarchical organization directory, that is stored in it's inode, extended attributes and/or any other way of associating metadata with file system objects, to the metadata stored in the record. Furthermore, the inconsistency detection and reconstruction tool 108 may repair or reconstruct the metadata in the hierarchical organization directory when the metadata does not match. In addition, the inconsistency detection and reconstruction tool 108 may repeat the step of determining whether a hierarchical organization directory is present for each record in the first file.

Similarly, the inconsistency detection and reconstruction tool 108 may detect inconsistencies and reconstruct the policy and configuration data files using the metadata associated with the policy and configuration data files stored in the second file.

In another example, if it is determined that the checksum of the first file does not match, the inconsistency detection and reconstruction tool 108 may conclude that the first file is inconsistent. In one example, the inconsistency detection and reconstruction tool 108 may reconstruct the first file by creating a record for each of the hierarchical organization directories in the file system 106. In this example, the inconsistency detection and reconstruction tool 108 may reconstruct the first file using information in the inode, and/or extended attributes in the hierarchical organization directories namespace.

Upon reconstructing the first file, the inconsistency detection and reconstruction tool 108 may determine whether records for all the hierarchical organization directories in the file system 106 are created. To determine whether records for all the hierarchical organization directories in the file system 106 are created, the inconsistency detection and reconstruction tool 108 may search the orphaned objects directory. Further, when a missing hierarchical organization directory is found in the orphaned objects directory, the hierarchical organization directory is restored to correct location in the hierarchical organization directory namespace and the metadata associated with the hierarchical organization directory is updated in the first file.

Similarly, if it is determined that the checksum of the second file does not match, the inconsistency detection and reconstruction tool 108 may conclude that the second file is inconsistent. Further, the inconsistency detection and reconstruction tool 108 may reconstruct the second file using metadata associated with policy and configuration data files which are stored as extended attributes, inode and/or any other mechanism for associating metadata with the policy and configuration data files.

FIG. 3 illustrates a block diagram of an example file system 300, such as shown in FIGS. 1 and 2. The file system 300 may be created on one or more segments of a storage device. As shown in FIG. 3, the file system 300 may include hierarchical organization directories 304 under a root directory 302. In the example illustrated in FIG. 3, the hierarchical organization directories 304 include organization directories (ODs) 306A and 306B and a default OD 306C under the root directory 302. Further, the hierarchical organization directories 304 include organization sub-directories (OSDs) 308A and 308B under the OD 306A, an OSD 308C under the OD 306B and a default OSD 308D under the default OD 306C. In an example, an organization directory can be a directory associated with an organization and an organization sub-directory can be a department within the organization. Furthermore as shown in FIG. 3, user directories (UDs) 312A-E including files 314A-E, respectively, are located under the associated OSDs 308A-C. For example, a user directory can be a directory associated with a user within the department in the organization.

In one example, the ODs 306A-C and OSDs 308A-D include policy and configuration data files. For example, the ODs 306A and 306B may include policy and configuration data files associated with authentication and the OSDs 308A-D may store policy and configuration data files associated with storage allocation. Example policy data includes hierarchical name and value pairs. The "name" is a policy name and "value" is the policy applicable. Further, the default OD 306C may store policy and configuration data files that is applicable to ODs 306A and 306B. Furthermore, the default OSD 308D may store policy and configuration data files that are applicable to OSDs 308A-C.

In an example, the database 310 may include metadata associated with the hierarchical organization directories 304 (ODs 306A and 306B and OSDs 308A-C) and policy and configuration data files. For example, the unique ID and the hierarchy of the ODs 306A and 306B and OSDs 308A-C are recorded in a file under the database. The file is used as the authentic source of information about the hierarchy and can be recreated. Further, for each policy hive (e.g., a group of policies) that includes a set of name and value pairs, a file is kept in the database 310.

Figure 4:
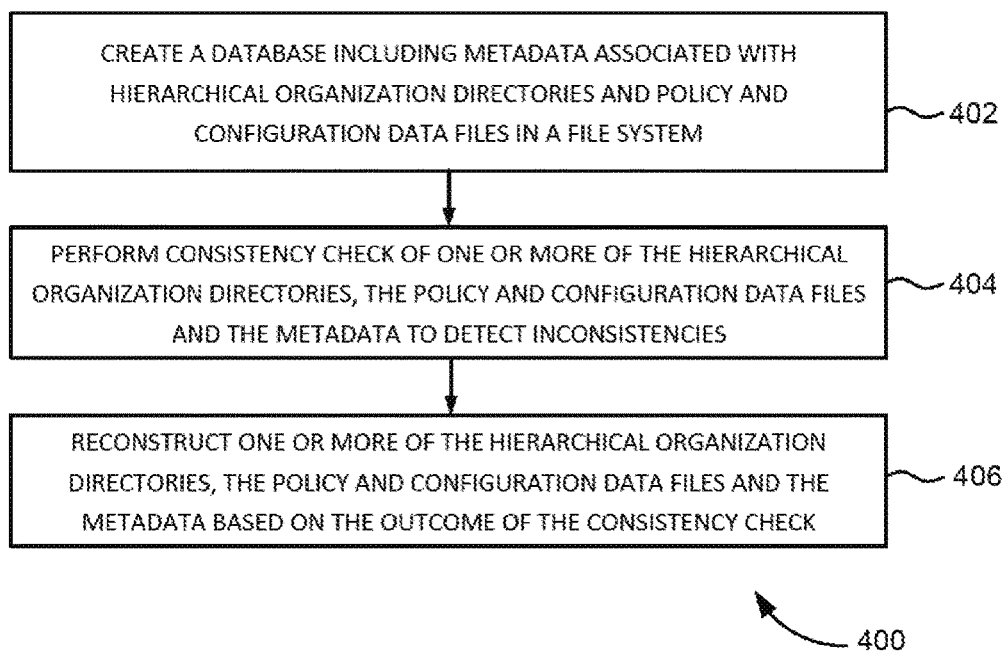
FIG. 4 illustrates a flow chart of an example method for detecting inconsistencies and reconstructing hierarchical organization directories, policy and configuration data files and/or metadata in a file system.

FIG. 4 illustrates a flow chart of an example method 400 for detecting inconsistencies and reconstructing hierarchical organization directories, policy and configuration data files and/or metadata in a file system. The method 400, which is described below, may be executed on a system such as a system 100 of FIG. 1 or system 200 of FIG. 2. However, other systems may be used as well. At block 402, a database including metadata associated with hierarchical organization directories and policy and configuration data files in the file system may be created. For example, the hierarchical organization directories are located between a root directory and user directories in the file system. In one example, metadata associated with the hierarchical organization directories and the policy and configuration data files are stored in extended attributes and/or inodes associated with the hierarchical organization directories and the policy and configuration data files, respectively. The metadata may include attributes, such as a name, a unique ID and an inode ID associated with the hierarchical organization directories and the policy and configuration files and ID of the hierarchical organization directories associated with the policy and configuration data files.

At block 404, consistency check of the hierarchical organization directories, the policy and configuration data files and/or the metadata in the database are performed to detect inconsistencies. For example, the consistency check is performed in response to receiving a request from an OS during one of a system crash, a periodic consistency check of file system and a user initiated consistency check. In one example, integrity of the metadata in the database is validated. For example, the integrity of the metadata is validated using checksum. This is explained in detail with reference to FIG. 1. Further, consistency check of the hierarchical organization directories and the policy and configuration data files are performed using the metadata in the database when the validation is successful.

At block 406, the hierarchical organization directories, the policy and configuration data files and/or the metadata may be reconstructed based on the outcome of the consistency check. In one example, the metadata may be reconstructed using the hierarchical organization directories and the policy and configuration data files when the validation is not successful. In this example, the metadata may be reconstructed by creating a record for each of the hierarchical organization directories and the policy and configuration data files. For example, each record may include metadata of an associated one of the hierarchical organization directories and the policy and configuration data files. The metadata includes attributes, such as of a name, a unique ID and an inode ID associated with the hierarchical organization directories and the policy and configuration files.

In another example, the hierarchical organization directories and the policy and configuration data files may be reconstructed using the metadata when the hierarchical organization directories or the policy and configuration data files are inconsistent. In this example, it may be determined whether a hierarchical organization directory or the policy and configuration data file corresponding to a record in the metadata is present in the file system. For example, the record may include metadata of the hierarchical organization directory or the policy and configuration data file. The metadata includes attributes, such as a name, a unique ID and an inode ID associated with the hierarchical organization directory or the policy and configuration file. Further, if it is determined that a hierarchical organization directory or the policy and configuration data file corresponding to the record in the metadata is not present, the hierarchical organization directory or the policy and configuration data file is created using the metadata. Furthermore, if it is determined that the hierarchical organization directory or the policy and configuration data file corresponding to the record in the metadata is present the step of determining is repeated for each record in the metadata.

Figure 5:
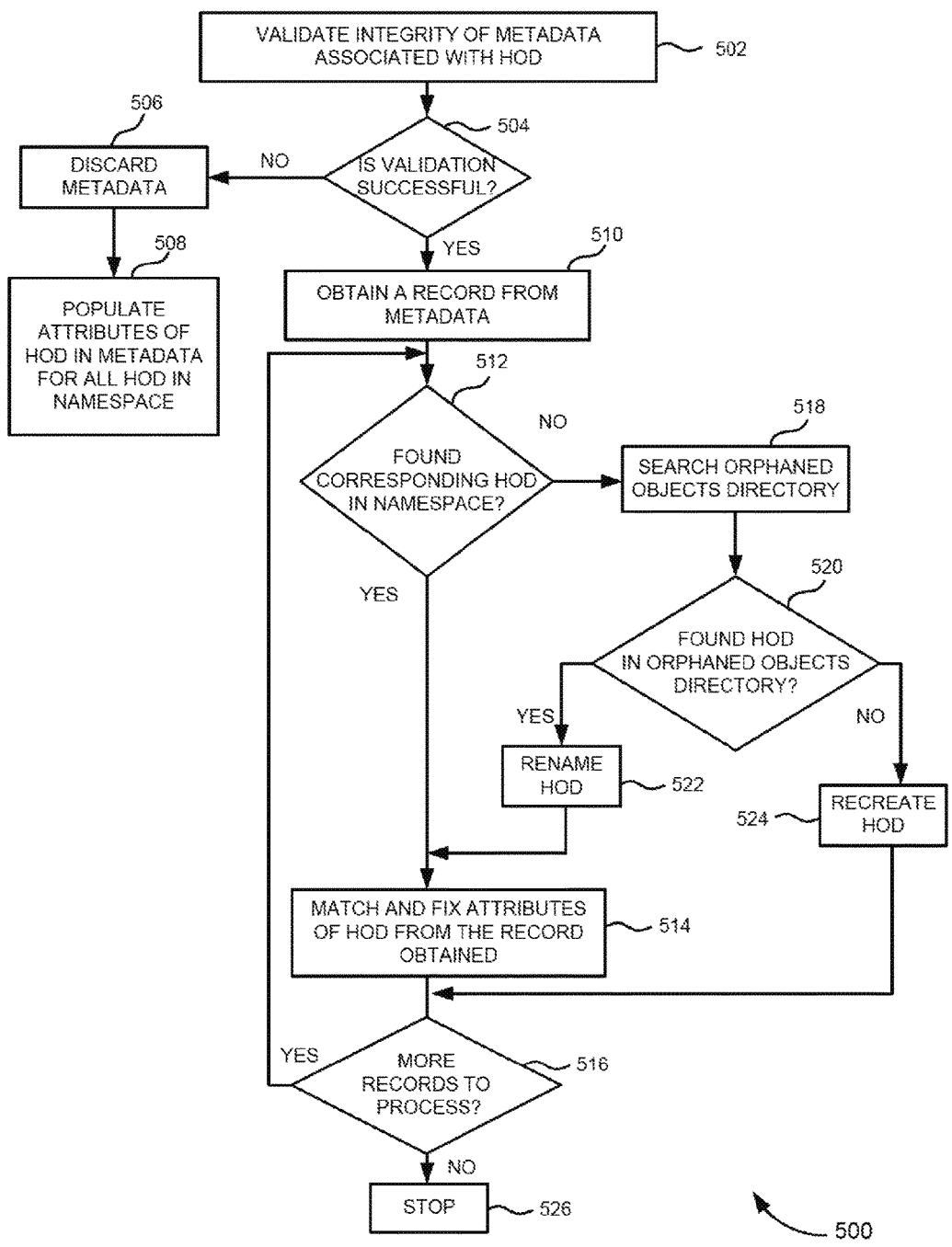
FIG. 5 illustrates a flow chart of an example detailed method for detecting inconsistencies and reconstructing hierarchical organization directories or metadata in a file system.

FIG. 5 illustrates a flow chart of an example detailed method 500 for detecting inconsistencies and reconstructing hierarchical organization directories or metadata in a file system. At block 502, integrity of metadata associated with hierarchical organization directories (HOD) (e.g., hierarchical organization directories 304 shown in FIG. 3) is validated. For example, the integrity of the metadata is validated using checksum. This is explained in detail with reference to FIG. 1.

At block 504, a check is made to determine whether the validation is successful. If the validation is not successful, discard the metadata at bock 506. At block 508, populate attributes of HOD in the metadata for all HOD present in the hierarchical organization directories namespace. For example, the attributes of HOD include a name, a unique ID, an inode ID and the like. If the validation is successful, obtain a record from the metadata at block 510. At block 512, a check is made to determine whether a HOD corresponding to the obtained record is found in the hierarchical organization directories namespace. If the HOD is found in the hierarchical organization directories namespace, match and fix attributes of HOD from the record obtained at block 514. At block 516, a check is made to determine whether any more records are to be processed in the metadata. If so, repeat the process steps from the block 512. If not, end the process at block 526.

If the HOD is not found in the hierarchical organization directories namespace, search an orphaned objects directory (e.g., a orphaned objects directory 316 shown in FIG. 3) at block 518. At block 520, a check is made to determine if the HOD is found in the orphaned objects directory. If the HOD is found in the orphaned objects directory, rename the HOD at block 522 and repeat the process steps from the block 514. If the HOD is not found in the orphaned objects directory, recreate the HOD at block 524 and repeat the process steps from the block 516.

Figure 6:
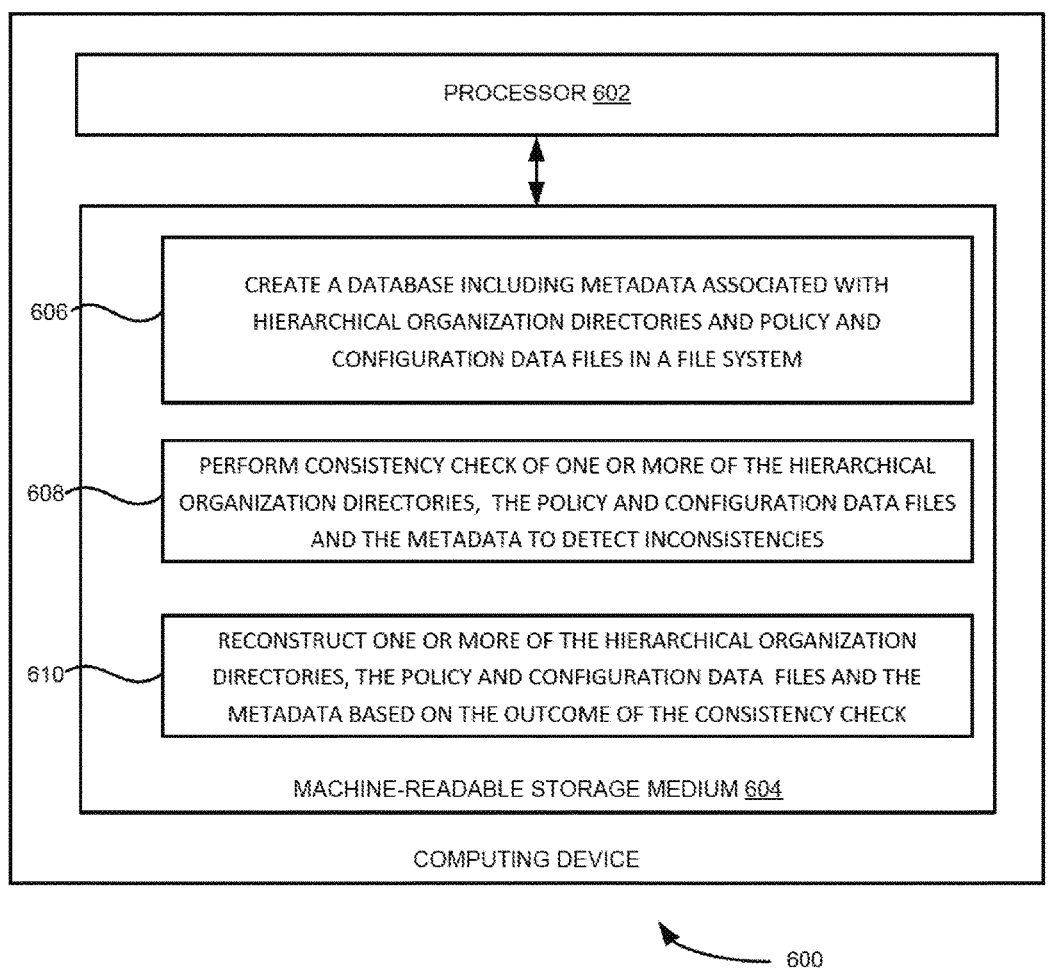
FIG. 6 illustrates a block diagram of an example computing device for detecting inconsistencies and reconstructing hierarchical organization directories, policy and configuration data files and/or metadata in a file system.

FIG. 6 illustrates a block diagram of an example computing device 600 for detecting inconsistencies and reconstructing hierarchical organization directories, policy and configuration data files and/or metadata in a file system. The computing device 600 includes a processor 602 and a machine-readable storage medium 604 communicatively coupled through a system bus. The processor 602 may be any type of central processing unit (CPU), microprocessor, or processing logic that interprets and executes machine-readable instructions stored in the machine-readable storage medium 604. The machine-readable storage medium 604 may be a random access memory (RAM) or another type of dynamic storage device that may store information and machine-readable instructions that may be executed by the processor 602. For example, the machine-readable storage medium 604 may be synchronous DRAM (SDRAM), double data rate (DDR), rambus DRAM (RDRAM), rambus RAM, etc., or storage memory media such as a floppy disk, a hard disk, a CD-ROM, a DVD, a pen drive, and the like. In an example, the machine-readable storage medium 604 may be a non-transitory machine-readable medium. In an example, the machine-readable storage medium 604 may be remote but accessible to the computing device 600.

The machine-readable storage medium 604 may store instructions 606, 608 and 610. In an example, instructions 606 may be executed by processor 602 to create a database including metadata associated with hierarchical organization directories and policy and configuration data files in a file system. Instructions 608 may be executed by processor 602 to perform consistency check of the hierarchical organization directories, the policy and configuration data files and/or the metadata. Instructions 610 may be executed by processor 602 to reconstruct the hierarchical organization directories, the policy and configuration data files and/or the metadata based on the outcome of the consistency check.

It may be noted that the above-described examples of the present solution is for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A system, comprising:
a processor; and
a storage device communicatively coupled to the processor, wherein the storage device comprises an inconsistency detection and reconstruction tool to:
create a database including a first plurality of records including metadata associated with respective hierarchical organization directories located between a root directory and user directories in a file system, and including a second plurality of records including metadata associated with respective policy and configuration data files in the file system;
in response to successful validation of the integrity of the metadata in the database, perform a consistency check using the metadata in the database to determine whether a respective hierarchical organization directory is present in the file system outside of an orphaned objects directory for each of the first plurality of records and to determine whether a respective policy and configuration data file is present in the file system outside of the orphaned objects directory for each of the second plurality of records;
in response to a determination that no hierarchical organization directory corresponding to one of the records of the first plurality of records is present in the file system outside of the orphaned object directory, create or restore a corresponding hierarchical organization directory, for the one of the records, in the file system outside of the orphaned object directory; and
in response to a determination that no policy and configuration data file is present for a given record of the second plurality of records, create or restore a corresponding policy and configuration data file for the given record of the second plurality of records using the metadata.

2. The system of claim 1, wherein the inconsistency detection and reconstruction tool is to validate the integrity of the metadata in the database and perform the consistency check of the hierarchical organization directories using the metadata in the database when the validation is successful.

3. The system of claim 2, wherein the inconsistency detection and reconstruction tool is to reconstruct the metadata in the database using the hierarchical organization directories and the policy and configuration data files when the validation is not successful.

4. The system of claim 3, wherein the inconsistency detection and reconstruction tool is to reconstruct the metadata in the database by creating a record for each of the hierarchical organization directories and the policy and configuration data files in the file system, wherein each record includes metadata associated with the hierarchical organization directories and the policy and configuration data files, wherein the metadata includes attributes selected from the group consisting of a name, a unique identifier (ID) and an inode ID associated with the hierarchical organization directories and the policy and configuration files.

5. The system of claim 1, wherein
the metadata of the records includes attributes selected from the group consisting of a name, a unique ID and an inode ID associated with the hierarchical organization directory or the policy and configuration file.

6. The system of claim 1, wherein the inconsistency detection and reconstruction tool is to perform the consistency check in response to receiving a request from an operating system during one of a system crash, a periodic consistency check of file system and a user initiated consistency check.

7. The system of claim 1, wherein the metadata associated with the hierarchical organization directories and the policy and configuration data files are stored in extended attributes and/or inodes of the hierarchical organization directories and the policy and configuration data files, respectively, wherein the metadata comprises attributes selected from the group consisting of a name, a unique ID and an inode ID associated with the hierarchical organization directories and the policy and configuration files and a unique ID of the hierarchical organization directories associated with the policy and configuration data files.

8. A method, comprising:
creating a database including a first plurality of records including metadata associated with respective hierarchical organization directories located between a root directory and user directories in a file system and including a second plurality of records including metadata associated with respective policy and configuration data files in the file system;
validating integrity of the metadata in the database;
in response to the validating being successful, performing a consistency check using the metadata in the database to determine, for each of the first plurality of records, whether a respective hierarchical organization directory is present in the file system outside of an orphaned objects directory;
in response to a determination that no hierarchical organization directory corresponding to one of the records of the first plurality of records is present in the file system outside of the orphaned object directory, creating or restoring a hierarchical organization directory for the one of the records in the file system outside of the orphaned object directory, and
in response to a determination that no policy and configuration data file corresponding to a given one of the records of the second plurality of records is present in the file system outside of the orphaned object directory, creating or restoring a policy and configuration data file for the given one of the records in the file system, outside of the orphaned object directory, using the metadata in the database.

9. The method of claim 8, further comprising:
reconstructing the metadata in the database using the hierarchical organization directories and policy and configuration data files when the validating is not successful.

10. The method of claim 9, wherein the reconstructing the metadata includes creating a record for each of the hierarchical organization directories and the policy and configuration data files in the file system, the record including an attribute of a name, a unique identifier (ID) or an inode ID associated with the hierarchical organization directories and the policy and configuration files.

11. The method of claim 8, further comprising performing the consistency check in response to a request from an operating system during one of a system crash, a periodic consistency check of file system and a user initiated consistency check.

12. A non-transitory machine-readable storage medium comprising instructions executable by a processor to:
create a database including a first plurality of records including metadata associated with respective hierarchical organization directories located between a root directory and user directories in a file system, and including a second plurality of records including metadata associated with respective policy and configuration data files in the file system;
in response to successful validation of the integrity of the metadata in the database, perform, using the metadata in the database, a consistency check to determine whether a respective hierarchical organization directory is present in the file system outside of an orphaned objects directory for each of the first plurality of records and to determine whether a respective policy and configuration data file is present in the file system outside of the orphaned objects directory for each of the second plurality of records; and
create or restore, in the file system outside of the orphaned object directory, at least one hierarchical organization directory or at least one policy and configuration data file based on at least one of the records of the database and the outcome of the consistency check.

13. The non-transitory machine-readable storage medium of claim 12, comprising instructions executable by the processor to validate the integrity of the metadata in the database.

14. The non-transitory machine-readable storage medium of claim 12, comprising instructions executable by the processor to reconstruct the metadata in the database using the hierarchical organization directories and the policy and configuration data files in response to unsuccessful validation of the integrity of the metadata in the database.

15. The non-transitory machine-readable storage medium of claim 14, wherein the instructions executable by the processor to reconstruct the metadata in the database includes instructions to create a record for each of the hierarchical organization directories and the policy and configuration data files in the file system, the record including an attribute of a name, a unique identifier (ID) or an inode ID associated with the hierarchical organization directories and the policy and configuration files.

16. The non-transitory machine-readable storage medium of claim 12, comprising instructions executable by the processor to perform the consistency check in response to a request from an operating system during one of a system crash, a periodic consistency check of file system and a user initiated consistency check.

17. The non-transitory machine-readable storage medium of claim 12, wherein the metadata associated with the hierarchical organization directories and the policy and configuration data files are stored in extended attributes or inodes of the hierarchical organization directories and the policy and configuration data files, respectively, wherein the metadata comprises attributes selected from the group consisting of a name, a unique ID and an inode ID associated with the hierarchical organization directories and the policy and configuration files and a unique ID of the hierarchical organization directories associated with the policy and configuration data files.

* * * * *